US009811848B2

(12) United States Patent
Reuss et al.

(10) Patent No.: US 9,811,848 B2
(45) Date of Patent: Nov. 7, 2017

(54) VERIFYING PURCHASERS OF RESTRICTED GIFTS

(71) Applicant: Facebook, Inc., Menlo Park, CA (US)

(72) Inventors: Nathan Reuss, Pacifica, CA (US); Christopher William Jones, Mill Valley, CA (US)

(73) Assignee: Facebook, Inc., Menlo Park, CA (US)

( * ) Notice: Subject to any disclaimer, the term of this patent is extended or adjusted under 35 U.S.C. 154(b) by 508 days.

(21) Appl. No.: 14/479,706

(22) Filed: Sep. 8, 2014

(65) Prior Publication Data

US 2016/0071175 A1 Mar. 10, 2016

(51) Int. Cl.
*G06Q 30/00* (2012.01)
*G06Q 30/06* (2012.01)
*G06Q 20/40* (2012.01)

(52) U.S. Cl.
CPC ..... *G06Q 30/0607* (2013.01); *G06Q 20/4014* (2013.01)

(58) Field of Classification Search
CPC .... G06Q 20/40; G06Q 30/06; G06Q 20/3821; G06Q 20/12; G06Q 20/206; G06Q 30/0261; G06Q 30/0641; G06Q 30/0251
See application file for complete search history.

(56) References Cited

U.S. PATENT DOCUMENTS 8,046,266 B1 * 10/2011 Geller .................... G06Q 30/02
705/14.1
9,508,096 B2 * 11/2016 Cummins .......... G06Q 30/0621

2002/0055911 A1 * 5/2002 Guerreri ............. G06Q 20/382
705/64
2004/0034568 A1 * 2/2004 Sone ...................... G06Q 30/06
705/26.81
2004/0111329 A1 * 6/2004 Moore ............... G06Q 30/0601
705/26.1
2007/0017976 A1 * 1/2007 Peyret .................... G06Q 20/10
235/380

(Continued)

FOREIGN PATENT DOCUMENTS

WO WO 2010048624 A1 * 4/2010 ............. G06Q 30/00

OTHER PUBLICATIONS

The "S" in Social Network Games: Initiating, Maintaining, and Enhancing Relationships published and presented at the Proceedings of the 44th Hawaii International Conference on System Sciences in 2011.*

*Primary Examiner* — Courtney L Stopp
(74) *Attorney, Agent, or Firm* — Fenwick & West LLP

(57) ABSTRACT

A social networking system provides verification of gift orders placed for restricted gifts. The restricted gift is subject to limitations on the giving and receiving of the gift, such as minimum age thresholds. A user purchasing the gift is directed from a social network to a landing page of a gifting system. At the landing page, the user provides login credentials to verify the user's identity within the purchase flow and prior to gift purchase. The social networking system verifies whether the login credentials match the user and determines whether the user may be permitted to purchase the restricted gift by comparing limitations of the restricted gift with profile information of the verified user. An order for the gift is provided to a gift delivery location where the recipient can receive the gift.

21 Claims, 3 Drawing Sheets

(56) References Cited

U.S. PATENT DOCUMENTS

| | | | | |
|---|---|---|---|---|
| 2007/0265913 A1* | 11/2007 | Brownlee | ............... | G06Q 30/02 |
| | | | | 705/14.56 |
| 2008/0048023 A1* | 2/2008 | Russell | ................. | G06Q 20/28 |
| | | | | 235/380 |
| 2013/0152155 A1* | 6/2013 | Donfried | ................. | G06F 21/00 |
| | | | | 726/1 |
| 2013/0339142 A1* | 12/2013 | Hewinson | ............... | G06Q 30/02 |
| | | | | 705/14.51 |
| 2014/0279187 A1* | 9/2014 | Gopinath | ............... | G06Q 50/01 |
| | | | | 705/26.7 |
| 2014/0324624 A1* | 10/2014 | Ward | .................... | H04W 4/021 |
| | | | | 705/26.7 |
| 2015/0039410 A1* | 2/2015 | Rone | ................. | G06Q 30/0222 |
| | | | | 705/14.23 |
| 2015/0205894 A1* | 7/2015 | Faris | ....................... | G06F 9/455 |
| | | | | 703/21 |

* cited by examiner

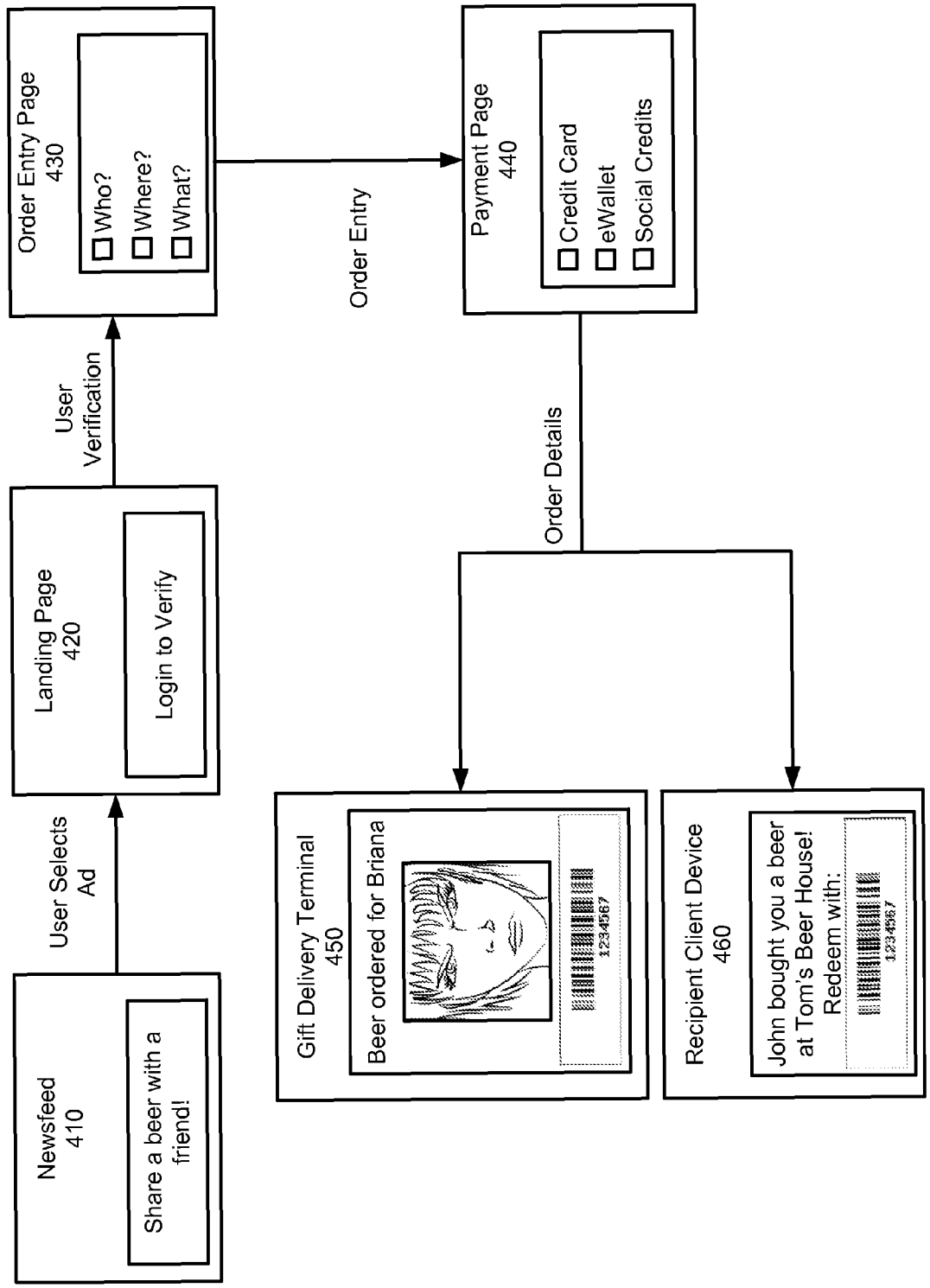

VERIFYING PURCHASERS OF RESTRICTED GIFTS

BACKGROUND

This invention relates generally to purchasing gifts for personal delivery, and in particular to verifying a purchaser meets limitations for purchasing restricted gifts.

People enjoy giving one another gifts, especially to celebrate special occasions, such as holidays and birthdays. When gifts are sent online, the recipient usually receives the gift electronically or by home delivery. But some gifts are subject to limitations on the gifting or receiving of gifts. For example, gifts of alcohol may trigger various regulations on the sale of liquor. These regulations may include, for example, that the gifting user is over a given age. In addition, verification and enforcement of these restrictions can be a barrier to adoption of restricted gifting to a wider audience.

SUMMARY

A user of a social networking system may send restricted gifts using a social networking system. These restricted gifts may include, for example, liquor to be delivered at a bar to the recipient. The social networking system presents the user with an advertisement or other content item suggesting the user to purchase a restricted gift. When the user interacts with the advertisement, the user is directed to a purchase flow at a gifting system, which may be provided by a third party. The gifting system directs the user to validate the user's identity with the social networking system, such as by providing login credentials. Though the user's device may already be logged in to the social networking system and associated with the user, the login credentials provided at the point of purchase provide an additional safeguard that the correct user is attempting to perform the purchase.

After receiving login credentials and identifying the user based on the login credentials, characteristics about the user are retrieved and compared to the limitations on the sale of the restricted gift. For example, the identified user's location and age may be identified as characteristics from the profile information and compared to the limitations of the gift. When the user is permitted to purchase the restricted gift, the user is directed to an order page.

At the order page, the gifting system provides an interface for the user to select a recipient, a location to receive the gift, and a specific gift. The recipient may be selected from connections of the user in the social networking system. Alternatively, the user may select a group from which the gifting system selects a member to send the gift. The group may be members of the social networking system, or may be another group outside of the social networking system. The gift system identifies gift delivery locations relevant to the selected recipient and provides the relevant locations to the user for selection of a location to provide the gift. The gifting system identifies the relevant gift delivery locations in one embodiment based on location information associated with the recipient and nearby gift delivery locations. In one embodiment, the selection is performed by the gift selection system, for example based on a gift delivery location where the recipient has previously received a gift or a gift delivery location within a threshold distance of the location information. To select a particular gift, the user may also view a menu of gifts to select from those available at the identified location. The user enters order information and the order is transmitted to the gift delivery location.

The order information may include identifying information about the recipient. In one embodiment, the identifying information includes information from the social networking system, such as a profile picture or other designated image of the recipient to assist staff at the gift delivery location identify the person to whom the gift is directed. Once the transaction is completed, the gift system sends the recipient a message (e.g., email or SMS) with a notification of the gift and the gift delivery location for the gift. The recipient redeems the gift at the location, e.g., by identifying himself, providing a code, and/or showing a machine-readable code.

BRIEF DESCRIPTION OF THE DRAWINGS

FIG. 4 shows an ordering process for generating and providing an order for a restricted gift, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
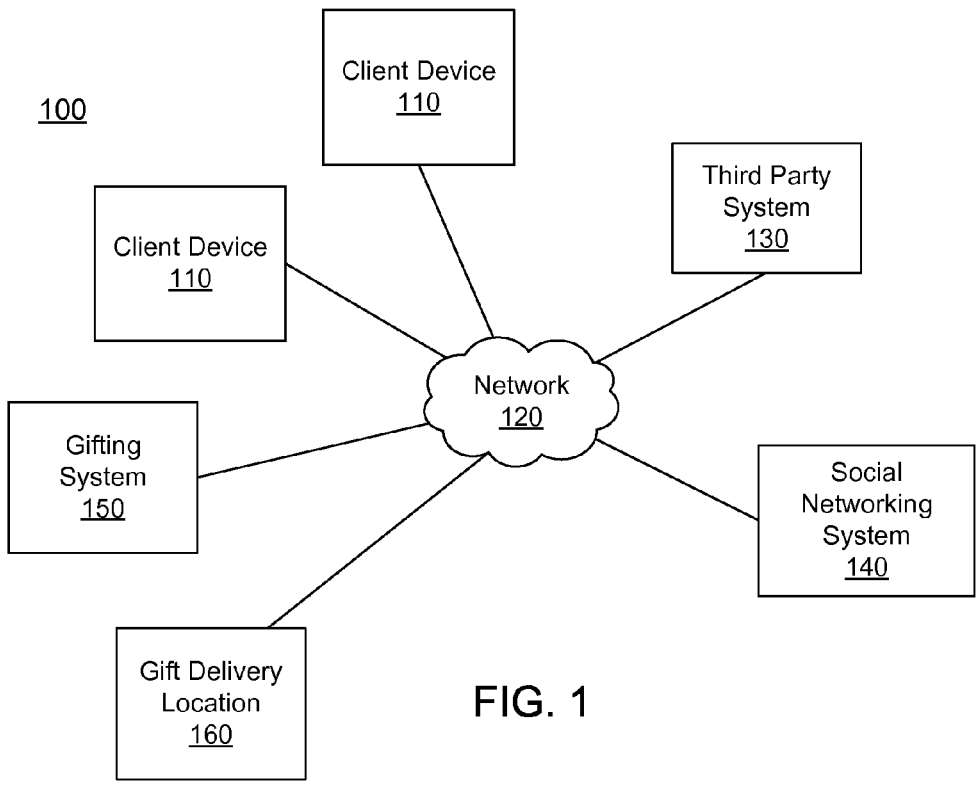
FIG. 1 is a block diagram of a system environment in which a social networking system operates, in accordance with an embodiment of the invention.

FIG. 1 is a high level block diagram of a system environment 100 for a social networking system 140. The system environment 100 shown by FIG. 1 comprises one or more client devices 110, a network 120, one or more third-party systems 130, the social networking system 140, and gifting system 150 and gift delivery system 160. In alternative configurations, different and/or additional components may be included in the system environment 100. The embodiments described herein can be adapted to online systems that are not social networking systems.

The social networking system 140 and gifting system 150 permit a user of the social networking system to provide a restricted gift to another user of the social networking system 140. As used herein, a restricted gift is a gift that has limitations on the sale or purchase of the restricted gift. These limitations may be set by the social networking system 140 or by gifting system 150, and may include limitations such as a minimum age for the gift, a geographic boundary for sending the gift, location for the gift, or a parental authorization. As one example of a restricted gift, a sale of alcoholic beverages such as beer or wine is typically restricted by age, and may additionally be restricted by location or by time and date. A purchaser may be required by local law have an age minimum to purchase alcohol, even for gifts to ultimately be consumed by another. Though alcohol is used as an example below, other restricted items (e.g., cigarettes) may also be used according to various limitations on gifts.

In some embodiments, the restricted gift is physically retrieved by the recipient of the gift at the gift location 160. When an order for the restricted gift is completed at the gifting system 150, the order is sent to the gift delivery location 160, along with details of the recipient. The recipient visits the gift delivery location (e.g., a bar) to receive the gift (e.g., a frosty brew). As described further below, the social networking system 140 assists with verification that limitations on the restricted gift are being met, and provides further social data for identifying recipients to receive the order and to augment delivery of the restricted gift.

The client devices 110 are one or more computing devices capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party website 130 may also communicate information to the social networking system 140, such as advertisements, content, or information about an application provided by the third party website 130.

The gifting system 150 performs order management and purchasing of restricted gifts to users of the social networking system 140. Though described here as a system external to the social networking system 140, the gifting system 150 in other embodiments are incorporated into the social networking system 140. The gifting system 150 receives requests from users to send a restricted gift and provides interfaces for the user to select a recipient, gift delivery location, and gift for the recipient. In the process of receiving an order for a gift, the gifting system 150 verifies the user's identity with the social networking system 140 and that the verified user identity is permitted to send the requested gift. The gifting system 150 assembles and completes the order for the gift with the sending user. The gifting system 150 sends the order to the gift delivery location 160 for fulfillment and sends a notification to the recipient that a gift has been sent to the recipient. The gifting system 150 may request data from the social networking system 140 as further described below for identifying recipients for the gifts, identifying information about users, and verifying identity of users.

The gift delivery location 160 delivers the gift to the recipient. In the example of alcoholic beverages, the gift delivery location 160 may be a bar or restaurant, though restricted gifts may be located at different places. Within the gift delivery location 160 is a terminal that receives completed orders from the gifting system 150 and provides the orders to an operator at the gift delivery location 160 for fulfillment. The terminal at the gift delivery location 160 may interact with a point-of-sale system at the gift delivery location 160 for providing accounting of orders and display of orders to staff at the gift delivery location. The terminal may be incorporated in the point-of-sale system or may be a stand-alone system. As further described below, the terminal at the gift delivery location 160 displays information about the order and may include a code or other identifying information for retrieving the order. When the identifying information is entered at the terminal, either by manual entry of the code or via a scanned code, e.g., barcode or QR code, the order is retrieved by the terminal and displayed for the operator to fulfill.

Figure 2:
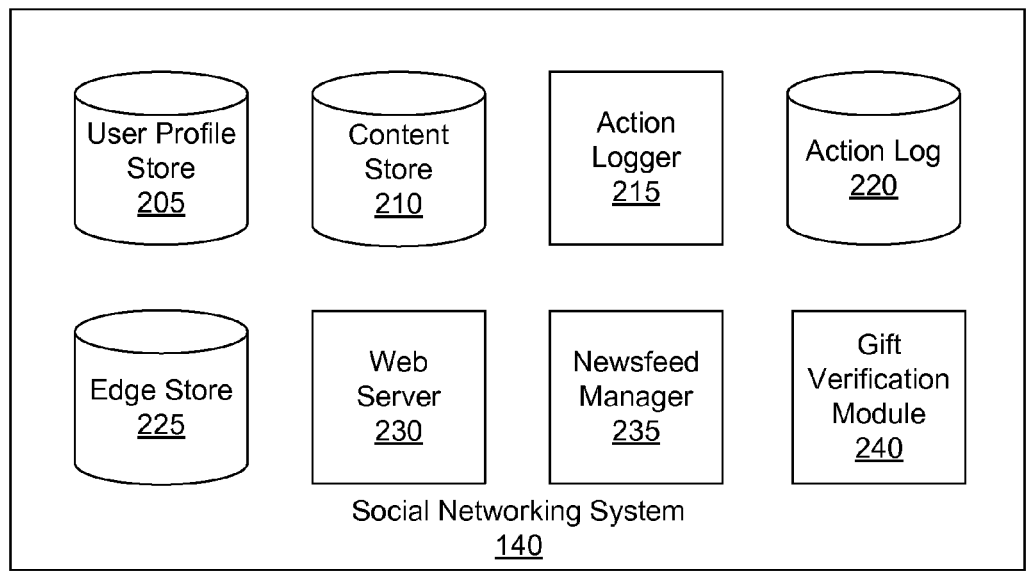
FIG. 2 is a block diagram of a social networking system, in accordance with an embodiment of the invention.

FIG. 2 is an example block diagram of an architecture of the social networking system 140. The social networking system 140 shown in FIG. 2 includes a user profile store 205, a content store 210, an action logger 215, an action log 220, an edge store 225, web server 230, newsfeed manager 235, and gift verification module 240. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding user of the social networking system 140. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 140 displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system, events, groups, or applications. In some embodiments, objects are received from third-party applications or third-party applications separate from the social networking system 140. In one embodiment, objects in the content store 210 represent single pieces of content or content "items." Hence, users of the social networking system 140 are encouraged to communicate with each other by posting text and content items of various types of media through various communication channels. This increases the amount of interaction of users with each other and increases the frequency with which users interact within the social networking system 140.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions is stored in the action log 210. Examples of interactions with objects include: commenting on posts, sharing links, and checking-in to physical locations via a mobile device, accessing content items, and any other interactions. Additional examples of interactions with objects on the social networking system 140 that are included in the action log 220 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user profile of the user and allowing a more complete understanding of user preferences.

The action log 220 may also store user actions taken on a third party system 130, such as an external website, and communicated to the social networking system 140. For example, an e-commerce website that primarily sells sporting equipment at bargain prices may recognize a user of a social networking system 140 through a social plug-in enabling the e-commerce website to identify the user of the social networking system 140. Because users of the social networking system 140 are uniquely identifiable, e-commerce websites may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying.

In one embodiment, an edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system, sharing a link with other users of the social networking system, and commenting on posts made by other users of the social networking system.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's affinity for an object, interest, and other users in the social networking system 140 based on the actions performed by the user. A user's affinity may be computed by the social networking system 140 over time to approximate a user's affinity for an object, interest, and other users in the social networking system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement requests ("ad requests") are included in the content 210 store. An advertisement request includes advertisement content and a bid amount. The advertisement content is text, image, audio, video, or any other suitable data presented to a user. The advertisements may include an advertisement to purchase a restricted gift for another user. In various embodiments, the advertisement content also includes a landing page specifying a network address to which a user is directed when the advertisement is accessed. For an advertisement for a restricted gift as described herein, the advertisement includes a link to a landing page of gifting system 15. The bid amount is associated with an advertisement by an advertiser and is used to determine an expected value, such as monetary compensation, provided by an advertiser to the social networking system 140 if the advertisement is presented to a user, if the advertisement receives a user interaction, or based on any other suitable condition. For example, the bid amount specifies a monetary amount that the social networking system 140 receives from the advertiser if the advertisement is displayed and the expected value is determined by multiplying the bid amount by a probability of the advertisement being accessed.

Additionally, an advertisement request may include one or more targeting criteria specified by the advertiser. Targeting criteria included in an advertisement request specify one or more characteristics of users eligible to be presented with content in the advertisement request. For example, targeting criteria are a filter to apply to fields of a user profile, edges, and/or actions associated with a user to identify users having user profile information, edges or actions satisfying at least one of the targeting criteria. Hence, the targeting criteria allow an advertiser to identify groups of users matching specific targeting criteria, simplifying subsequent distribution of content to groups of users. In one example, the targeting criteria for advertisements of restricted gifts target users whose connections recently became eligible to receive a restricted gift. For example, a limitation of alcoholic sales may include that the receiving user must be over a threshold age, such as 21. One targeting criteria using this limitation for an advertisement of alcohol is to target users whose connections are having a $21^{st}$ birthday within a threshold period number of days.

In one embodiment, the targeting criteria may specify actions or types of connections between a user and another user or object of the social networking system 140. The targeting criteria may also specify interactions between a user and objects performed external to the social networking system 140, such as on a third party system 130. For example, the targeting criteria identifies users that have taken a particular action, such as sending a message to another user, using an application, joining a group, leaving a group, joining an event, generating an event description, purchasing or reviewing a product or service using an online marketplace, requesting information from a third-party system 130, or any other suitable action. Including actions in the targeting criteria allows advertisers to further refine users eligible to be presented with content from an advertisement request. As another example, targeting criteria may identify users having a connection to another user or object or having a particular type of connection to another user or object.

In one embodiment, the social networking system 140 identifies stories likely to be of interest to a user through a "newsfeed" presented to the user. A story presented to a user describes an action taken by an additional user connected to the user and identifies the additional user. In some embodiments, a story describing an action performed by a user may be accessible to users not connected to the user that performed the action. The newsfeed manager 235 may generate stories for presentation to a user based on information in the action log 220 and in edge store 225 or may select candidate stories included in content store 210. One or more of the candidate stories are selected and presented to a user by the newsfeed manager 235.

For example, the newsfeed manager 235 receives a request to present one or more stories to a social networking system user. The newsfeed manager 235 accesses one or more of the user profile store 205, the content store 210, the action log 220, and the edge store 225 to retrieve information about the identified user. For example, stories or other data associated with users connected to the identified user are retrieved. The retrieved stories or other data is analyzed by the newsfeed manager 235 to identify content likely to be relevant to the identified user. For example, stories associated with users not connected to the identified user or stories associated with users for which the identified user has less than a threshold affinity are discarded as candidate stories. Based on various criteria, the newsfeed manager 235 selects one or more of the candidate stories for presentation to the identified user.

In various embodiments, the newsfeed manager 235 presents stories to a user through a newsfeed, which includes a plurality of stories selected for presentation to the user. The newsfeed may include a limited number of stories or may include a complete set of candidate stories. The number of stories included in a newsfeed may be determined in part by a user preference included in user profile store 205. The newsfeed manager 235 may also determine the order in which selected stories are presented via the newsfeed. For example, the newsfeed manager 235 determines that a user has a highest affinity for a specific user and increases the number of stories in the newsfeed associated with the specific user or modifies the positions in the newsfeed where stories associated with the specific user are presented.

The newsfeed manager 235 may also account for actions by a user indicating a preference for types of stories and selects stories having the same, or similar, types for inclusion in the newsfeed. Additionally, newsfeed manager 235 may analyze stories received by social networking system 120 from various users and obtains information about user preferences or actions from the analyzed stories. This information may be used to refine subsequent selection of stories for newsfeeds presented to various users.

The web server 230 links the social networking system 140 via the network 120 to the one or more client devices 110, as well as to the one or more third party systems 130. The web server 140 serves web pages, as well as other web-related content, such as JAVA®, FLASH®, XML, and so forth. The web server 230 may receive and route messages between the social networking system 140 and the client device 110, for example, instant messages, queued messages (e.g., email), text messages, short message service (SMS) messages, or messages sent using any other suitable messaging technique. A user may send a request to the web server 230 to upload information (e.g., images or videos) that are stored in the content store 210. Additionally, the web server 230 may provide application programming interface (API) functionality to send data directly to native client device operating systems, such as IOS®, ANDROID™, WEBOS®, or RIM®.

The gift verification module 240 manages interactions between the social networking system 140 and the restricted gift ordering provided by gifting system 150. The gift verification module 240 provides additional verification of users after the user has accessed a landing page of the gifting system 150. The gift verification module 240 receives a request to provide verification from the client device 110 or from gifting system 150. The gift verification module 240 communicates with the client device 110 to receive login credentials. These credentials may be provided by several ways that generally provide a secured transmission of credentials to the social networking system 140. In one example, login credentials are received from a browser of the client device 110, either directly accessing the social networking system 140, or through the gifting system 150. That is, in these embodiments, these login credentials are requested from the user even if the user device 110 is associated with a logged-in user (for example, a user device that responded to an advertisement presented in the social networking system 140 and visited the gifting system 150). The login credentials include sufficient information to verify the user of the client device 110, such as a username and password, pass phrase, and biometric information.

Using the login credentials, the gift verification module 240 verifies that the login credentials are correct for the user. Next, the gift verification module 240 determines whether the user may purchase the restricted gift based on characteristics of the user stored in the social network 140. Such characteristics may include, for example, information stated in the user's profile, such as age, location, or a permission granted by another user (e.g., a parental permission), which generally correspond to the limitation of the particular gift. The limitation(s) relevant to the particular gift may be predetermined by the gift verification module 240, and in some embodiments the request to verify the user includes one or more limitations for the restricted gift. The gift verification module 240 may also request desired limitations from the gifting system 150 after the user's identity has been verified. The retrieved characteristics of the user profile are compared with the limitations of the gift, and when the user profile possesses characteristics indicated in the limitation, the gift verification module 240 performs an action to verify the user and permit the sale of restricted gifts to proceed. As example actions, the action to permit the sale may be providing a credential to the client device 110, notifying the gifting system 150, or directing the client device 110 to an order page of the gifting system 150. The gift verification module 240 may also store or update a cookie or other static object to the user device to identify that the user device has been verified by the gift verification module 240.

The gift verification module 240 also includes an interface that provides and receives information from gifting system 150. The interface receives requests for information from the gifting system 150 and in response the gift verification module 240 retrieves the requested information and sends the requested information to the gifting system 150 via the interface. The requested information may include candidate recipients to receive the restricted gift. The gift verification module 240 accesses the user profile store 205 and edge store 225 to identify users as candidates to receive the restricted gift. The candidates may be selected based on parameters specified in the request. Such parameters may specify, for example, connections of the user purchasing the restricted gift. In addition, the parameters may specify limitations on users that may receive the restricted gift, which may be the same limitations of the purchasing user. This permits verification that any users to be provided the gifts are also permitted to receive the restricted gift. The gift verification module 240 retrieves candidates that match the requested parameters from the user profile store, and provides the candidate users to the gifting system. The candidate users may be selected, ranked, or both based on an affinity score between the user and each of the candidate users.

Information about the user and recipient users may also be provided to the gifting system 150. Responsive to a request from the gifting system 150, the gift verification module 240 retrieves this information from user profiles or associations between users and other social networking objects. Such information may include, for example, groupings of connections of the purchasing user, location information of the recipient user, characteristics of the users, and membership of a user in a group, among others.

The gifting system 150 may also request candidate gift delivery locations to provide the gift to a particular user. For example, the user providing the gift may select a particular candidate user, and the gifting system 150 requests candidate gift delivery locations from gift verification module 240. The gift verification module 240 receives a request to identify candidate locations for a recipient and identifies, for that recipient, gift delivery locations based on information in content store 210 and edge store 225. Specifically, the gift verification module 240 retrieves location information associated with the recipient to identify a likely location of the recipient or areas that the recipient is associated with, such as areas that the user typically frequents. Next, the gift verification module 240 queries the content store 210 to identify social networking objects that are gift delivery locations 160 within a threshold distance of the locations associated with the user. The gift verification module 240 may receive a list of gift delivery locations 160 from the gifting system 150 and identify social networking objects as gift delivery locations. The gift verification module 240 may rank the retrieved social networking objects according to the recipient's affinity for the social networking objects. These identified gift delivery locations are sent to the gifting system 150 from the gift verification module 240.

The gift verification module 240 may also assist in fulfillment of a placed order. When an order is placed at gifting system 150, gifting system 150 may provide the order to the social networking system 140. The social networking system provides a notification to the recipient that a gift has been ordered for the recipient. The notification is sent to a client device 110 associated with the recipient, including information about the order and the gift delivery location 160 at which the recipient can receive the restricted gift.

When receiving a placed order, the gift verification module 240 may also generate a content item for publishing to a newsfeed or other communication method of the social networking system 150. The newsfeed may describe the order, gift location, and other details of the order. In addition, the generated content item may include a link to the landing page of the gifting system 150 to encourage users viewing the content item to also provide gifts to other users.

In one configuration, the gift order provided by the gifting system 150 does not specify a user to receive the gift, and instead specifies a characteristic of a user to receive the gift. The characteristic may include users that are not connected to the gifting user. For example, the gifting system 150 may provide a promotion to send a restricted gift to a firefighter. The order generated by this promotion designates that a recipient of the gift have the characteristic "firefighter." The order is received by the gift verification module 240 and designates the characteristic for the promotion. The gift verification module 240 accesses user profile store 205 to identify candidate recipients possessing the characteristics of the order. From the candidates, the gift verification module 240 may rank and select a recipient using profile data of the gifting user and the candidates. This selection may be based, for example, on the location of the gifting user and the recipient (e.g., to provide a "local" gift), or may be based on the affinity between the gifting user and the recipient user (e.g., to select a connection of the user meeting the characteristic), or based on location information of candidates recipients and gift delivery locations 160 (e.g., to provide a gift to a recipient that is already in or near a gift delivery location 160). After selecting the recipient, the recipient may be provided to the gifting system 150 for order completion and to notify the gift delivery location of the recipient of the gift. In addition to selecting a recipient, candidate gift delivery locations 160 may also be identified and provided as described above. In one embodiment, the candidate users are specified prior to order completion, such that the gifting system 150 may finalize and complete the order with the candidate selected by the social networking system as a suggestion to the gifting user.

Financial and credit information may also be managed by gift verification module 240. In certain social networking systems 140, the social networking system 140 maintains a virtual currency or credits associated with users, and may also maintain payment details for users of the social networking system 140 to conduct transactions with one another or with components of the social networking system 140. The gift verification module 240 may receive a request from the gifting system 150 to negotiate payment of the restricted gift with the purchaser. The client device 110 of the purchaser communicates with the gift verification module 240 to provide payment credentials, such as authorization to use the virtual currency for the purchase or to access one of the stored payment details. The user may also provide a new payment method (e.g., a new credit card), to be processed for payment. The gift verification module 240 reports successful payment to the gifting system 150.

Figure 3:
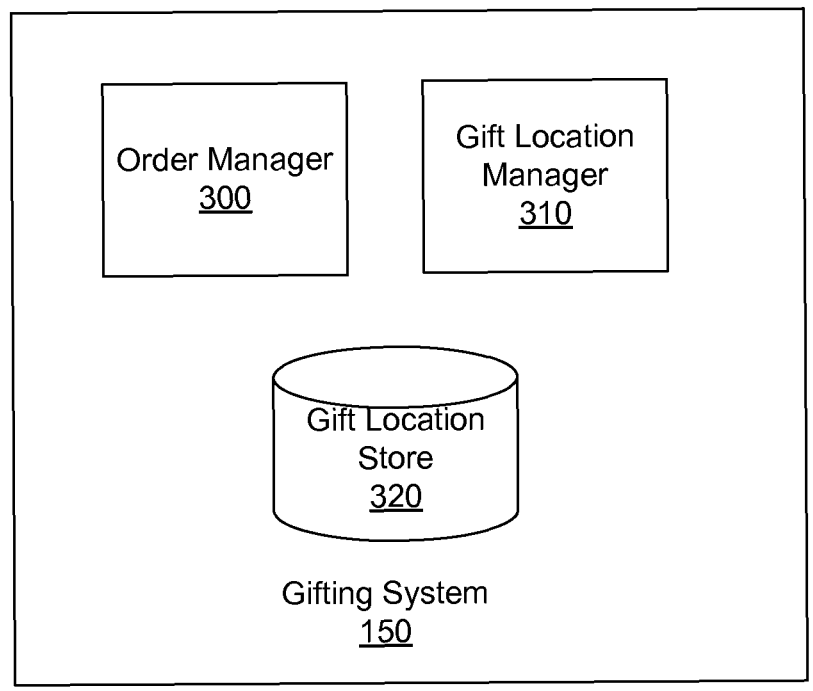
FIG. 3 shows components of a gifting system 150, in accordance with an embodiment of the invention.

FIG. 3 shows components of a gifting system 150 according to one embodiment. In this embodiment, the gifting system includes various components for assembling and providing orders for restricted gifts, ensuring payment for restricted gifts, and communicating with gift delivery locations 160 for fulfillment of the gift. The gifting system 150 shown in FIG. 3 includes an order manager 300, gift location manager 310, and gift location store 320. The gift location store 320 and menu store 330 are data storage components that maintain data associated with the gift delivery locations 160. The individual gift delivery locations stored in gift location store 320 area associated with records that include, for example, a name, photos, and geographic (e.g., location) information. The records also include menu information associated with the gift delivery locations 160. For certain restricted gifts, each gift delivery location 160 may provide a single type of restricted gift, but for others, multiple types of restricted gifts may be provided, such as at a bar for an alcoholic beverage gift.

Further operation of order manager 300 is described with reference to FIG. 4. The order manager 300 provides an ordering process shown in FIG. 4 for users accessing the gifting system 150 to generate an order for a restricted gift. Users initially access order manager 300 via a landing page 420 provided by the order manager 300. Users typically access the landing page 420 via a newsfeed 410 or other display of content on the social networking system 140. As shown in FIG. 4, the newsfeed 210 provides a content item promoting the sale of the restricted gift and provides a link to the landing page 420. The landing page 420 directs the user to provide login credentials to the social networking system 140 to verify that the user meets limitations of the restricted gift. The login credentials may be provided in an iframe or other dedicated portion of the landing page 420 that directs the user device 110 to access the social networking system 140. The order manager 300 optionally provides the limitation for verification to the social networking system 140, which may be directly provided from the order manager 300 to the social networking system 140, or may be indirectly provided by the client device 110.

After receiving an indication that the client device 110 is verified by the social networking system 140 as meeting the limitations of the restricted gift, the order manager 300 provides an order entry page 430 to the client device 110 for entering information about the order. The order information in one embodiment includes a recipient, a gift delivery location 160, and the restricted gift to be delivered. The order manager 300 requests a list of connections of the user from the social networking system 150 as potential recipients of the gift. These recipients are received by the gifting system 150 and provided for the user to select a gift recipient. In one embodiment, rather than requiring the user to select a recipient, the user selects a characteristic of a recipient. When a characteristic is provided, the gifting system 150 provides the characteristic of the recipient and receives from the social networking system 140 a selected user that meets the characteristic as the recipient of the gift. For example, the user may designate "a firefighter" as the characteristic, and the gifting system 150 requests a user meeting this characteristic as the user to receive the gift.

A gift delivery location 160 is selected by the user via the order entry page 430. The gift delivery location of the order is selected by the user from a list of candidate gift delivery locations selected from gift location store 320, and may also be provided based on a list of candidate gift delivery locations provided by the social networking system 140. As described above, the gift delivery locations provided by the social networking system may be based on location information of the recipient as well as affinity of the recipient towards social networking objects associated with gift delivery locations. After selecting the gift delivery location, the order manager 300 accesses the gift location store 320 to retrieve a menu for the selected gift delivery location 160 and provides the menu to client device 110 for display to the user in an interface. After receiving a specific restricted gift from the client device 110, an order is assembled and the user is provided a payment page 440 to select payment for the order. The payment page 440 permits the user to enter payment details at the payment page 440, or to interact with social networking system 140 to pay using social credits, an electronic wallet, or other payment details maintained by the social networking system 140.

After completion of the order, the order manager sends the order information to the recipient and to the gift delivery location 160 at which the user will receive the gift. In one embodiment, the completed order is associated with a code, which may include a scannable code such as a barcode or QR code. The order manager sends a notification to the recipient's user device 460 to display the order and, if available, the scannable code. The recipient's user device 460 may be requested from the social networking system 160, or the gifting system 150 may provide the order to the social networking system 140 for delivery to the recipient's client device 460.

The order is also delivered to a gift delivery terminal 450 located at the order's gift delivery location 160. The gift location manager 310 receives the order from order manager 300 and provides the order to a terminal associated with the gift delivery location 160. The gift location manager 310 may also request identifying details from the social networking system 140 for identifying the recipient when the recipient arrives at the gift delivery location. Such identifying details may include age, sex, a user profile picture, and a representative photograph of the recipient among others. The order and identifying details of the recipient are transmitted to the gift delivery terminal 450 for display to an operator at the gift delivery location 160. When the recipient arrives at the gift delivery location 160, the recipient can request the gift. Using the scannable code, the gift delivery terminal 450 may scan the code provided by the recipient client device 460 to retrieve the order for the recipient and optionally display the identifying details to an operator of the gift delivery terminal 450. The operator of the gift delivery terminal can review the order and confirm that the recipient is consistent with the identifying details prior to providing the gift to the recipient.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
providing an advertisement to a client device of a user logged in at a social networking system, the advertisement promoting a restricted gift subject to a limitation on sale of the restricted gift, the limitation on sale of the restricted gift being related to user characteristics, the advertisement including a link to a landing page external to the social networking system, and the advertisement being displayed to the user by the social networking system;
receiving a request to verify the identity of the user of the client device accessing the landing page; and
responsive to the request to verify the identity of the user at the landing page:
receiving login credentials from the client device,
verifying that the login credentials received from the client device match those of the user logged in at the social networking system;
determining based on the characteristics of the user in the social networking system, that the user may purchase the restricted gift;
generating an order entry page for the restricted gift;
receiving one or more recipients to receive the restricted gift;
receiving a selection from a list of possible delivery locations, the list of possible gift delivery locations being generated based on one or more of recipient affinities or actions within the social networking system;
processing a purchase of the restricted gift for the selected recipient and delivery location; and
providing information about the purchase of the restricted gift to a terminal located at the gift delivery location, the information about the purchase including identification of the one or more recipients.

2. The method of claim 1, wherein a user characteristic related to the user meeting the limitation on sale of the restricted gift comprises one or more of an age limit, a location, and a parental permission.

3. The method of claim 1, wherein the request to verify the identity of the user includes the limitation on sale and information about the user characteristics related to the limitation on sale.

4. The method of claim 1, wherein the selected restricted gift is provided at the gift delivery location to a recipient of the gift.

5. The method of claim 1, further comprising receiving an order for the restricted gift, the order identifying a group of social networking system users; and identifying, in the group of users, a user to be the recipient of the restricted gift.

6. The method of claim 1, wherein generating a list of possible gift delivery locations comprises:
retrieving location data associated with the recipient; and
determining a set of candidate physical gift delivery locations within a threshold distance of the location data associated with the one or more recipients.

7. The method of claim 1, further comprising receiving an order for the restricted gift, the order identifying a recipient of the restricted gift having a user profile in the social networking system; and determining whether the recipient may receive the restricted gift based on a characteristic of the user profile of the recipient meeting a limitation on the receipt of the restricted gift.

8. The method of claim 1, further comprising providing information about the purchase to a client device of the recipient.

9. The method of claim 8, wherein information about the purchase that is provided to the client device of the recipient includes a code that can be displayed at the client device of the recipient, and wherein the information about the purchase that is provided to the terminal includes information to identify the recipient based on the code.

10. The method of claim 1, further comprising providing, to the client device, a list of possible gift delivery locations, the list of locations being based on one or more of location information about the recipient and data about an affinity of the recipient toward social networking objects associated with gift delivery locations.

11. The method of claim 1, wherein identification of a recipient provided to the terminal comprises one or more of a profile picture, the age of the recipient, the sex of the recipient, and a representative photograph of the recipient.

12. A non-transitory computer readable medium containing computer program code for:
providing an advertisement to a client device of a user logged in at a social networking system, the advertisement promoting a restricted gift subject to a limitation on sale of the restricted gift, the limitation on sale of the restricted gift being related to user characteristics, the advertisement including a link to a landing page external to the social networking system, and the advertisement being displayed to the user by the social networking system;
receiving a request to verify the identity of the user of the client device accessing the landing page; and
responsive to the request to verify the identity of the user at the landing page:
receiving login credentials from the client device,
verifying that the login credentials received from the client device match those of the user logged in at the social networking system;
determining based on the characteristics of the user in the social networking system, that the user may purchase the restricted gift;
generating an order entry page for the restricted gift;
receiving one or more recipients to receive the restricted gift;
receiving a selection from a list of possible delivery locations, the list of possible gift delivery locations being generated based on one or more of recipient affinities or actions within the social networking system;
processing a purchase of the restricted gift for the selected recipient and delivery location; and
providing information about the purchase of the restricted gift to a terminal located at the gift delivery location, the information about the purchase including identification of the one or more recipients.

13. The non-transitory computer readable medium of claim 12, wherein a user characteristic related to the user meeting the limitation on sale of the restricted gift comprises one or more of an age limit, a location, and a parental permission.

14. The non-transitory computer readable medium of claim 12, wherein the request to verify the identity of the user includes the limitation on sale and information about user characteristics that meet the limitation on sale.

15. The non-transitory computer readable medium of claim 12, wherein the selected restricted gift is provided at the gift delivery location to a recipient of the gift.

16. The non-transitory computer readable medium of claim 12, containing computer program code for receiving an order for the restricted gift, the order identifying a group of social networking system users; and identifying, in the group of users, a user to be the recipient of the restricted gift.

17. The non-transitory computer readable medium of claim 12, wherein generating a list of possible gift delivery locations comprises:
retrieving location data associated with the recipient; and
determining a set of candidate physical gift delivery locations within a threshold distance of the location data associated with the one or more recipients.

18. The non-transitory computer readable medium of claim 12, further comprising receiving an order for the restricted gift, the order identifying a recipient of the restricted item having a user profile in the social networking system; and determining whether the recipient may receive the restricted gift based on a characteristic of the user profile of the recipient meeting a limitation on the receipt of the restricted gift.

19. The non-transitory computer-readable medium of claim 12, further comprising providing information about the purchase to a client device of the recipient, wherein information about the purchase that is provided to the client device of the recipient includes a code that can be displayed at the client device of the recipient, and wherein the information about the purchase that is provided to the terminal includes information about how to identify the recipient based on the code provided to the client device of the recipient.

20. The non-transitory computer-readable medium of claim 12, further comprising providing, to the client device, a list of possible gift delivery locations, the list of locations being based on one or more of location information about the recipient and data about an affinity of the recipient toward social networking objects associated with gift delivery locations.

21. The non-transitory computer-readable medium of claim 12, wherein identification of a recipient provided to the terminal comprises one or more of a profile picture, the age of the recipient, the sex of the recipient, and a representative photograph of the recipient.

\* \* \* \* \*